United States Patent [19]

Cushman et al.

[11] 4,194,023
[45] Mar. 18, 1980

[54] CONTROLLED DEPOSITION OF ASPHALT EMULSIONS

[75] Inventors: Donald R. Cushman, Wenonah; Charles A. Pagen, West Deptford; John W. Schick, Cherry Hill, all of N.J.

[73] Assignee: Mobil Oil Corporation, New York, N.Y.

[21] Appl. No.: 944,823

[22] Filed: Sep. 22, 1978

[51] Int. Cl.$^2$ ............................ E01C 5/12; B05D 5/10
[52] U.S. Cl. ...................................... 427/138; 404/75; 404/82; 405/264; 405/265; 427/301
[58] Field of Search ............... 427/138, 136, 299, 301, 427/403; 404/72, 75, 76, 82; 405/264, 265; 106/281 R, 281 N, 282, 283

[56] References Cited
U.S. PATENT DOCUMENTS

| | | | |
|---|---|---|---|
| 2,389,680 | 11/1945 | Mikeska | 106/281 |
| 2,438,318 | 3/1948 | Johnson | 106/281 |
| 2,469,728 | 5/1949 | Holmes | 427/299 |
| 2,644,771 | 7/1953 | Kempthorne | 427/403 |
| 2,838,466 | 6/1958 | Padbury et al. | 405/264 |
| 3,633,310 | 1/1972 | Sandiford | 405/264 |
| 3,677,014 | 7/1972 | Stout et al. | 405/264 |
| 3,689,298 | 9/1972 | Dybalski et al. | 106/282 |
| 3,868,263 | 2/1975 | McConnaughay | 106/281 |
| 4,038,102 | 7/1977 | Hellsten et al. | 106/281 |

*Primary Examiner*—Michael F. Esposito
*Assistant Examiner*—Sadie L. Childs
*Attorney, Agent, or Firm*—Charles A. Huggett; James F. Powers, Jr.; Hastings S. Trigg

[57] ABSTRACT

There is provided a method for depositing asphalt from an asphalt emulsion onto an aggregate, as in road construction. Prior to applying the asphalt emulsion, the aggregate is wetted down with water containing a minor amount of an anionic or a cationic coupling agent selected to have a charge opposite to that of the asphalt emulsion.

9 Claims, No Drawings

CONTROLLED DEPOSITION OF ASPHALT EMULSIONS

BACKGROUND OF THE INVENTION

1. Field of the Invention

This invention is concerned with an improved process for applying asphalt emulsion to an aggregate.

2. Description of the Prior Art

It has been the practice in road construction to select the type of asphalt emulsion to suit the aggregate used. Most aggregates used are predominantly electropositive or electronegative in the presence of water. When using an electropositive aggregate such as dolomite, an anionic (−) asphalt emulsion is employed because the negatively charged asphalt particles will be attracted to the electropositive aggregate and tend to be more readily deposited. On the other hand, a cationic (+) asphalt emulsion would be repelled by the aggregate and will not deposit on the aggregate until the water phase has evaporated.

When using an electronegative aggregate, such as the commonly used sandstones, the practice is to use a cationic (+) asphalt emulsion. An anionic (−) emulsion will not deposit on the aggregate until the water phase has evaporated.

By including a minor amount of a properly selected coupling agent, in accordance with this invention, in the water to wet down the aggregate prior to applying the asphalt emulsion, the application can be relatively independent of the type of aggregate. It is generally accepted that the electrochemical property of the aggregate determines whether good adhesion will be obtained with asphalt emulsions. This property is the nature of the electrical surface charge that the aggregate possesses when it is in contact with water. If the aggregate is dry, the electrical charges are practically nonexistent because adsorbed ions neutralize the electrical charge on the aggregate surface. In the presence of water, these ions dissociate from the aggregate surface, become dissolved in the water and the aggregate bears an electrical charge. When the aggregate and the asphalt emulsion are antagonistic, e.g., (+), good adhesion is attained if the coupling agent has a charge opposite the asphalt emulsion. In general, even when the aggregate and the asphalt emulsion are compatible, e.g., (−) vs. (+), adhesion can be enhanced when the coupling agent has a charge the same as that of the aggregate and opposite to that of the asphalt emulsion. It should be noted that the aggregate surface electrical charges range from those that are extremely electropositive to those that are extremely electronegative. Seldom does an aggregate have a surface charge that is entirely electropositive or electronegative because of the complex minerology involved. In most aggregates, both types of charges are present; for the aggregates may contain both silicon which will permit the surface to have some negative charges, and also calcium, iron, magnesium and/or aluminum which will allow the surface to have positive charges. Thus, the use of coupling agents will improve the deposition of asphalt onto typical aggregate with mixed electrical charges, such as basalts, porphyries, siliceous limestones, etc.

SUMMARY OF THE INVENTION

This invention provides a method for depositing asphalt from an asphalt emulsion onto an aggregate, that comprises wetting down the aggregate with water containing between about 0.01 weight percent and about 1.0 weight percent of coupling agent selected to have a charge opposite to the charge of said asphalt emulsion and applying said asphalt emulsion to the wetted aggregate.

DESCRIPTION OF SPECIFIC EMBODIMENTS

In practicing the method of this invention, no additional equipment is needed beyond that generally used in road construction. After the aggregate has been laid, it is wetted down with water. Thus, the method of this invention involves dissolving 0.01–1% of the proper coupling agent in the water before wetting down.

The cationic coupling agent comprises a salt of a complex amine polymer. Typical examples of these salts include polyamine salts obtained by reacting reduced polyacrylamide with a fatty acid, such as formic, acetic, propionic, and higher acids. Also exemplary of these salts are those obtained by the reaction of N-alkyl trimethylene diamines, containing alkyl groups having at least 14 carbon atoms, with the fatty acids.

The anionic coupling agents are alkali metal salts of carboxyl functional polymeric materials. A typical utilizable coupling agent is a potassium salt of a partially hydrolyzed polyacrylamide.

Both cationic and anionic coupling agents are commercially available and are sold as retention aids in paper manufacture. The amount of coupling agent added to the water used to wet down the aggregate is minor, between about 0.01 weight percent and about one weight percent.

Asphalt emulsions, both anionic and cationic are well known and are widely available commercially. In general, the electrostatic charge on the surface of the asphalt particles depends upon the emulsifying agent used. The anionic (−) asphalt emulsions are emulsified with soaps of long chain fatty acids or mixtures, such as tall oil fatty acids. The cationic (+) asphalt emulsions are emulsified with amine salts of mineral or lower fatty acids, such as hydrochlorides of diamines or polyamines.

In practice, asphalt road construction is highly affected by weather conditions. Even when the aggregate and the asphalt emulsion have opposite polarities, e.g., electronegative aggregate with cationic (+) emulsion, some time is allowed to permit evaporation of water from the emulsion to start, in order to promote asphalt deposition on the aggregate. For this reason, if there is any likelihood of rain, asphalt road construction generally will not be scheduled because rain could wash away most or all the emulsion. Obviously, during a prolonged period of rainfall, construction could be delayed for days.

The dependence on rain-free periods is virtually eliminated by the method of this invention. By using the proper coupling agent, asphalt emulsion can be deposited on the aggregate even though it may rain shortly after deposition has been completed. A suitable combination is an electronegative aggregate, such as sand or gravel commonly used in many localities, a cationic (+) coupling agent solution wet down, and an anionic (−) asphalt emulsion. This combination has been found to afford complete or virtually complete deposition of asphalt on the aggregate, despite the fact that the combination was thoroughly washed with running water (simulating rainfall) right after the asphalt emulsion had been laid down.

The following examples demonstrate the method of this invention and provide comparisons with prior art procedures. In the examples, the cationic coupling agent is a salt obtained by reacting a polyacrylamide reduced to the amine and reacted with acetic acid. The anionic coupling agent is a potassium salt of partially hydrolyzed (about 16%) polyacrylamide.

EXAMPLES 1 THROUGH 4

A series of runs was made in beakers using the following procedure: (1) The aggregate was placed in a beaker and wetted down (pre-wet) with water or a dilute aqueous solution of coupling agent. (2) Asphalt emulsion was poured evenly on the surface of the wet aggregate and stirred slightly. (3) The mixture was then washed by overflowing the beaker with running water for about one minute or until the wash water was clear. (4) Finally, the amount of asphalt remaining adhered to the aggregate and calculated as the weight percent of the asphalt applied that remained on the aggregate was determined. This procedure simulates asphalt road construction followed by rainfall. Pertinate data and results are set forth in Table I.

TABLE I

| Example | 1 | 2 | 3 | 4 |
|---|---|---|---|---|
| Aggregate | Sand | → | → | → |
| Aggregate charge | Negative (−) | → | → | → |
| Wt. aggregate, g. | 50 | 50 | 50 | 50 |
| Coupling agent in pre-wet Cationic (+), % | 0 | 0.1 | 0 | 0.1 |
| Asphalt emulsion, g. | 5 | 5 | 5 | 5 |
| Asphalt in emulsion, g. | 1.5 | 1.5 | 1.5 | 1.5 |
| Type emulsion | Anionic (−) | | Cationic (+) | |
| Asphalt on aggregate after wash, g. | 0.11 | 1.15 | 0.77 | 0.006 |
| % Asphalt remaining | 7 | 77 | 51 | 0.4 |

From the data in Table I, Example 1 demonstrates the poor adhesion of negative asphalt to a negative aggregate, when no coupling agent is used. Example 2 shows how adhesion is enhanced by the use of a cationic (+) coupling agent. Example 3 demonstrates that good adhesion is attained in the absence of coupling using a common combination of positive asphalt with a negative aggregate, while Example 4 shows that a cationic (+) coupling agent is the wrong coupling agent for this combination.

EXAMPLES 5 THROUGH 7

A series of runs were carried out using the procedure of Examples 1-4. In these runs, the coupling agent (when used) was anionic (−). Pertinent data and results are set forth in Table II.

TABLE II

| Example | 5 | 6 | 7 |
|---|---|---|---|
| Aggregate | Sand | → | → |
| Aggregate charge | Negative (−) | → | → |
| Wt. aggregate, g. | 50 | 50 | 50 |
| Coupling agent in pre-wet Anionic (−) % | 0 | 0.05 | 0.01 |
| Asphalt emulsion, g. | 5 | 5 | 5 |
| Asphalt in emulsion, g. | 1.5 | 1.5 | 1.5 |
| Type emulsion | Cationic (+) | → | → |
| Asphalt on aggregate after wash, g. | 1.24 | 1.48 | 1.39 |
| % Asphalt remaining | 83 | 99 | 93 |

In Table II, Example 5 shows good adhesion obtained with the combination of positive asphalt on negative aggregate. Examples 6 and 7 show how the use of an anionic coupling agent, at two concentration levels in the pre-wet water, enhances adhesion.

EXAMPLES 8 THROUGH 11

A series of runs was carried out using the general procedure of Examples 1-4, except using a Buchner funnel instead of a beaker. The funnel was covered with a thin layer of glass wool and then the aggregate. For final wash, water (about ½ pint) was poured through the funnel. In Examples 8 and 9, slight stirring was used after addition of asphalt emulsion. In Examples 10 and 11, there was no stirring. The pertinent data and results are set forth in Table III.

TABLE III

| Example | 8 | 9 | 10 | 11 |
|---|---|---|---|---|
| Aggregate | Sand | → | → | → |
| Aggregate charge | Negative (−) | → | → | → |
| Wt. aggregate, g. | 50 | 50 | 50 | 50 |
| Coupling agent in pre-wet Anionic (−), % | 0 | 0.1 | 0 | 0.01 |
| Asphalt emulsion, g. | 5 | 5 | 5 | 5 |
| Asphalt in emulsion, g. | 1.5 | 1.5 | 1.4 | 1.4 |
| Type emulsion | Cationic (+) | → | → | → |
| Asphalt on aggregate after wash, g. | 0.92 | 1.45 | 0.55 | 0.8 |
| % Asphalt remaining | 61 | 97 | 39 | 57 |

In Table III, Examples 8 and 9 and Examples 10 and 11 demonstrate improved results when the coupling agent is properly selected. The procedure in Examples 10 and 11 simulates application directly on soil, in stabilizing slopes and flat areas adjacent to highways, i.e., asphalt mulch treatment.

EXAMPLES 12 THROUGH 17

Using the general procedure described in Examples 1-4, a series of runs was made using variations in aggregate, coupling agent, and asphalt emulsion. In these runs, an evporating dish was used to allow the test area to be more spread out. Pertinent data results are set forth in Table IV.

TABLE IV

| Example | 12 | 13 | 14 | 15 | 16 | 17 |
|---|---|---|---|---|---|---|
| Aggregate | Limestone | → | → | → | Gravel | → |
| Aggregate charge | Positive (+) | → | → | → | Negative (−) | → |
| Wt. aggregate, g. | 22.7 | 23.0 | 24.8 | 24.8 | 32.9 | 33.0 |
| Coupling agent in pre-wet | 0 | | 0 | | 0 | |
| Anionic (−),% | | 0.05 | | | | |
| Cationic (+),% | | | | 1.0 | | 1.0 |
| Asphalt emulsion, g. | 3.7 | 3.7 | 6.2 | 6.3 | 10.1 | 10.0 |
| Asphalt in emulsion, g. | 2.2 | 2.2 | 3.7 | 3.8 | 6.1 | 6.0 |
| Type emulsion | Cationic (+) | → | Anionic (−) | → | | |
| Asphalt on aggregate after wash, g. | 0 | 1.3 | 0.13* | 1.49* | 0 | 6.0 |

TABLE IV-continued

| Example | 12 | 13 | 14 | 15 | 16 | 17 |
|---|---|---|---|---|---|---|
| % Asphalt remaining | 0 | 59 | 3.5 | 39 | 0 | 100 |

*Single water rinse only.

In Table IV, Examples 12 and 13 and Examples 14 and 15 show the improved adhesion to electropositive limestone aggregate using coupling agents. Examples 16 and 17 demonstrate how complete adhesion of asphalt to gravel, a common and readily available aggregate, can be achieved. Results indicate that a road could be laid and then be followed shortly after by rainfall with nil loss of asphalt due to run off.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for depositing asphalt from an asphalt emulsion onto an aggregate, that comprises wetting down the aggregate with water containing between about 0.01 weight percent and about 1.0 weight percent of coupling agent selected to have charge opposite to the charge of said asphalt emulsion and applying said asphalt emulsion to the wetted aggregate.

2. The method of claim 1, wherein said aggregate is sand, said coupling agent is cationic, and said asphalt emulsion is anionic.

3. The method of claim 2, wherein said coupling agent is the salt of a reduced polyacrylamide and acetic acid.

4. The method of claim 1, wherein said aggregate is sand, said coupling agent is anionic, and said asphalt emulsion is cationic.

5. The method of claim 4, wherein said coupling agent is a potassium salt of 16 percent hydrolyzed polyacrylamide.

6. The method of claim 1, wherein said aggregate is limestone, said coupling agent is anionic, and said asphalt emulsion is cationic.

7. The method of claim 6, wherein said coupling agent is a potassium salt of 16 percent hydrolyzed polyacrylamide.

8. The method of claim 1, wherein said aggregate is gravel, said coupling agent is cationic, and said asphalt emulsion is anionic.

9. The method of claim 8, wherein said coupling agent is the salt of a reduced polyacrylamide and acetic acid.

* * * * *

Disclaimer

4,194,023.—*Donald R. Cushman*, Wenonah; *Charles A. Pagen*, West Deptford and *John W. Schick*, Cherry Hill, N.J. CONTROLLED DEPOSITION OF ASPHALT EMULSIONS. Patent dated Mar. 18, 1980. Disclaimer filed Oct. 7, 1982, by the assignee, *Mobil Oil Corp.*

Hereby enters this disclaimer to claims 1, 2, 4, 6 and 8 of said patent.

[*Official Gazette December 14, 1982.*]